United States Patent [19]
Batten et al.

[11] 3,720,252
[45] March 13, 1973

[54] TIRE WITH FOLDED STABILIZER PLIES

[75] Inventors: Thomas Allen Batten; Stephen Thomas Griebling, both of Akron, Ohio

[73] Assignee: The Firestone Tire & Rubber Company, Akron, Ohio

[22] Filed: Oct. 12, 1970

[21] Appl. No.: 79,835

[52] U.S. Cl. .............................. 152/361, 156/128 R
[51] Int. Cl. ................................................ B61c 9/18
[58] Field of Search ............ 152/354, 355, 356, 361; 156/128 I, 128 R, 133

[56] References Cited

UNITED STATES PATENTS 3,409,492 11/1968 Yoe ............................... 156/128 I
3,568,750 3/1971 Henning ........................... 152/354

FOREIGN PATENTS OR APPLICATIONS 1,144,555 3/1969 Great Britain ....................... 152/361
1,494,766 9/1967 France ............................... 152/361

*Primary Examiner*—Gerald M. Forlenza
*Assistant Examiner*—George H. Libman
*Attorney*—S. M. Clark and Olaf Nielsen

[57] ABSTRACT

A vehicle tire and a method for building it, wherein a folded stabilizer structure having cords inclined to the rotational axis of the tire is located under the tire tread, such that, in the expanded tire, the cord angle in the stabilizer structure increases toward the folded margins.

9 Claims, 8 Drawing Figures

PATENTED MAR 13 1973  3,720,252
FIG.1
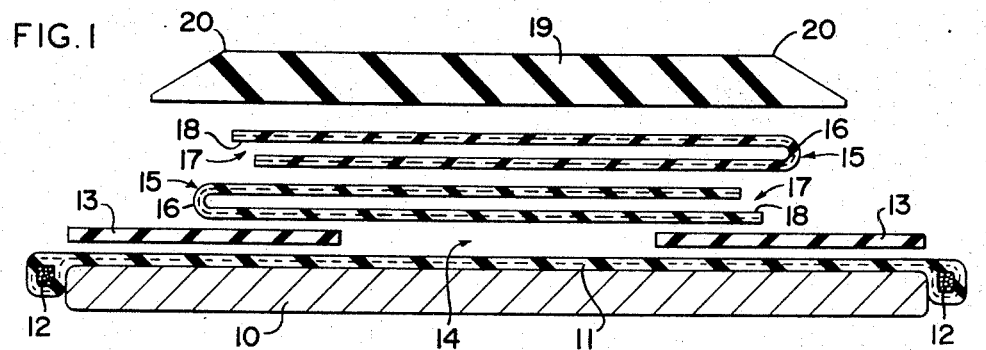
FIG.2
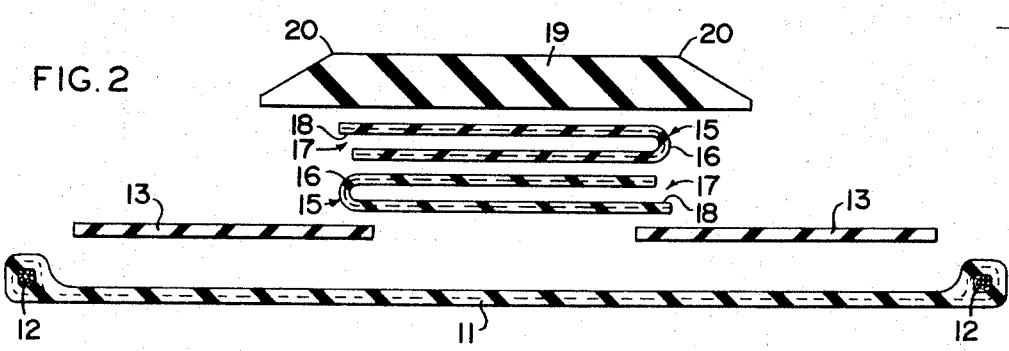
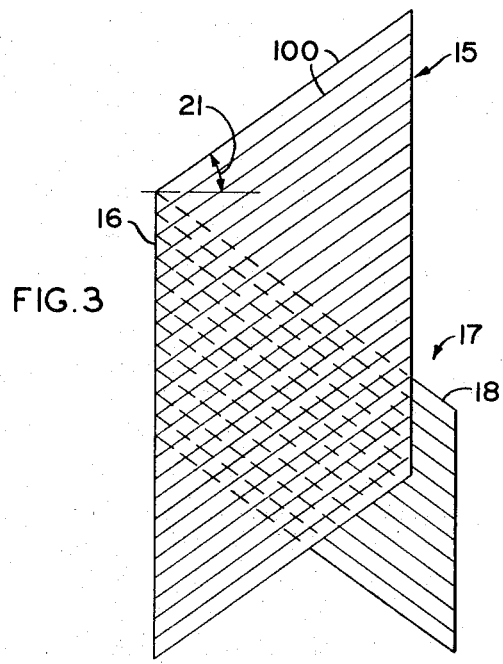
FIG.3
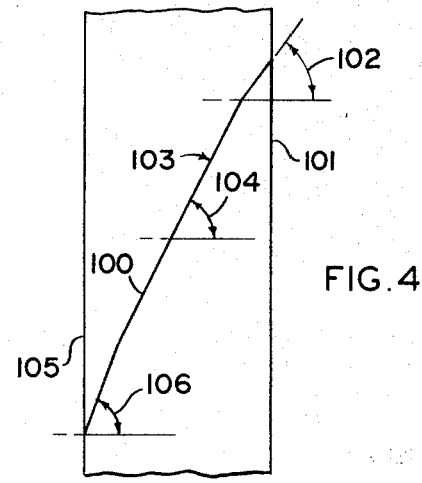
FIG.4
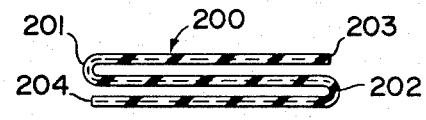
FIG.5
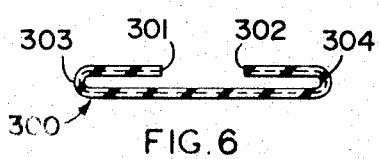
FIG.6
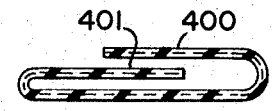
FIG.7
FIG.8

TIRE WITH FOLDED STABILIZER PLIES

BACKGROUND OF THE INVENTION

The invention pertains to an improved tire, either bias or radial, and the method of producing the uncured preparation in its entirety on a single building machine.

Radial tires are generally identified as having cords in its body portion which lie substantially in radial planes passing through the rolling axis of the tire; bias tires, on the other hand, have their body-ply cords extending at an angle to the rolling axis.

One type of present production of radial tires is identified as "two-stage", and involves assembling the first portion of the tire (such as the body ply or plies, the tire beads and the tire sidewalls) on a flat, cylindrical drum, thereafter expanding and, in a second operation, placing the stabilizer structure (frequently of the folded type) and tread onto the expanded portion; vulcanization follows.

It is also known to produce radial tires by the single-stage method. This method of building involves placing body material on a flat, cylindrical drum, anchoring the body plies to beads at the ends of the drum, then placing narrow plies with cords which are angled with respect to the rolling axis of the tire, expanding the completed tire including a tread, from cylindrical to toroidal shape while the angled or biased cords increase the angle they make with this rolling axis, and thereafter vulcanizing.

This procedure constitutes part of the disclosure of German Pat. No. 1,017,776, to Continental Gummi-Werke, issued Apr. 10, 1958. Additionally, it is well-known in the art that a cylindrical band of bias-laid cord, upon being expanded radially to a greater diameter, narrows in the axial direction, as the angle the cord makes with the tire axis, the crown-angle, increases.

The single-stage method, as disclosed in the above-mentioned German patent has been practiced with the use of narrow stabilizer plies which have a cut edge at each side, but has not been able to utilize the wide widths necessary to provide good tread-wear, due to the so-called "trailing off" of the cords at the cut edges, a condition described and shown in French Pat. No. 1,408,978, granted July 12, 1965 to The Firestone Tire & Rubber Co., and a condition which worsens as stabilizers of greater widths are attempted.

The two-stage method has utilized folded stabilizer plies over radial body plies, but with definite shortcomings. The known folded stabilizers exhibit generally high, uniform crown angles when measured at different points across the width of the stabilizer ply, 74° being a good example in the cured tire. This construction, and this type of angle, while producing a commercial-quality tire, with good characteristics of cornering, lane-transition and general handling, nevertheless detracts from the desirable soft ride-characteristics desired. Tire Uniformity Grading (TUG), a measure of the acceptability, was also hopefully to be improved. Additionally, the two-stage production-method is clearly high in equipment and handling-costs, and requires extra care in stitching together the stabilizer ply and tread and the remainder of the tire.

SUMMARY OF THE INVENTION

It is therefore an object of the invention to provide a tire whose stabilizer structure has, in the center area, the low crown-angles necessary to give a soft ride, while at the same time having, near the shoulder areas of the tire, the higher crown angles required for stability.

This is accomplished by a tire having a body structure, with a rubberized cord stabilizer structure at a large radius of curvature, under the tread, the stabilizer structure having two folded and, selectively, two open margins and a width approaching that of the tread, and cord angles which, measured with respect to the tire rolling axis, increase from the central portion of the stabilizer toward the folded margins.

BRIEF DESCRIPTION OF THE DRAWINGS

FIG. 1 shows an exploded diagrammatic view of the tire as constructed, in its un-expanded, uncured condition.

FIG. 2 shows an exploded diagrammatic view of the relative positions of the tire components of FIG. 1, but in the expanded and vulcanized tire.

FIG. 3 shows a portion of a stabilizer structure in the unvulcanized state.

FIG. 4 shows the path of a cord of the stabilizer structure in an expanded and vulcanized tire.

FIG. 5 shows the cross-sectional shape of a modified stabilizer structure in an expanded and vulcanized tire.

FIG. 6 shows the cross-sectional shape of another modification of the stabilizer structure in an expanded and vulcanized tire.

FIG. 7 shows the cross-sectional shape of yet another modification of a stabilizer structure in an expanded vulcanized tire.

FIG. 8 shows the cross-sectional shape of a further modification of a stabilizer structure in an expanded vulcanized tire.

DESCRIPTION OF PREFERRED EMBODIMENTS

Although numbered consecutively, such numbering is not determinative of relative utility of the embodiments.

I

In FIG. 1, there is shown a cylindrical tire-building drum 10; to this has been applied a tire body 11 comprised of one or more plies of rubberized reinforcing cords extending substantially parallel to the axis of the tire building drum 10, with the margins of the tire body anchored at each end of the drum 11 to inextensible beads 12.

Sidewall portions 13 are placed on the tire body 11, with their axially inner margins spaced from the structure center line. Spanning the open area 14, and extending axially beyond the sidewall edges is a stabilizer structure having two superimposed stabilizers 15, each of rubberized cord fabric and folded to present a folded margin 16 at one side and a cut, or open, margin 17 at the other side, shown with a step 18.

The stabilizer plies are located with the folded margins 17 left and right, respectively; so long as they are placed with one fold right and one left, however, the order does not matter. Over the top of the stabilizers is placed the tire tread 19.

When the completed, uncured tire is now expanded from cylindrical to toroidal shape, the tire beads move axially together toward the center line of the structure, while the remainder of the tire is raised radially. During this expansion, the stabilizer-tread combination is caused to contract radically in the axial direction, while the sidewall portions move slightly in the same direction.

In FIG. 2 is shown the relative location of the tire components of FIG. 1, but in the vulcanized state. Constructing, as an example, a FR70-14 size tire, the stabilizers 15 which were approximately 10.25 inches wide in the unvulcanized state, are approximately 5.8 inches wide as vulcanized. Similarly, the tire tread 19, approximately 12 inches wide in the uncured state is, after cure, approximately 8.5 inches wide. In the vulcanized condition, the stabilizer of the present example is thus about 97 percent of the shoulder-width of the tire-tread. A relationship of this magnitude is helpful in producing good tread-wear qualities in the tire. The shoulder-width 20-20 of the tread changes from 9½ inches in the unvulcanized state, to 6 inches in the vulcanized state. While the tread-shoulder width thus undergoes a reduction of about 37 percent, the stabilizer reduces by about 44 percent. Accordingly, it will be seen that the faster rate of width-reduction in the stabilizer may dictate, for certain tire constructions, that the stabilizer originally be substantially wider than the tread shoulder width.

The most dramatic change caused to occur by the present construction-method, however, is seen by reference to FIGS. 3 and 4. In FIG. 3 is shown an unvulcanized stabilizer ply 15 of the example-tire, with cords 100 angled or biased uniformly at an angle 21 of approximately 35° to the rolling axis of the tire; it is folded at 16 and has a cut, or open, margin 17, the individual ply ends being stepped 0.375 inch as at 18.

FIG. 4 shows a cord within a portion of the stabilizer in its vulcanized form within the tire structure, and demonstrates the unusual configuration imparted to the cured stabilizer by selection of the folded construction and its condition of width relative the tread width; large arc-radius, even to absolute flatness or 'negative' arc; and bias-angle.

In FIG. 4, a single cord 100 is selected to show the cord-paths in the stabilizer structure which produce the combination of soft ride and good handling characteristics in the vulcanized example-tire of the invention. At the open end margin 101, the cords 100 have an angle of inclination 102 of approximately 53°–55° to the tire rotation axis. Across the major, central portion 103 of the stabilizer structure, the cords have an inclination 104 of about 61°–65° to the tire axis; and at the folded margin 105, an inclination 106 of approximately 67°–69° to the tire axis.

It will be seen that there is thus here created a stabilizer structure whose cords, related to the tire rotation axis, extend at an increasing angle from the open margin of the structure toward the folded margin.

This arrangement places at the central portion of the tire a stabilizer crown-angle which is sufficiently low to be conducive to soft ride, while the stabilizer, at its open margin has a still lower angle and, at its folded margins exhibits the higher crown angle necessary for good handling characteristics, i.e., stability. Concurrently, the invention makes possible the use of stabilizer plies of greater vulcanized width than heretofore in single-stage building, namely approaching, and even beyond, 100 percent of the tread-shoulder width, with a resultant improvement in wear not possible with narrower stabilizer plies.

Since the folded, wide stabilizer improves tire tread wear, its use is not limited to the radial tire of the example, but may be used effectively as well with tires whose body plies have cords extending at angles to the tire rotation axis.

As will be seen hereinafter, an advantage is obtained also with a single stabilizer which exhibits folded margins only, i.e. the lower angle is caused to appear at the center, and the high angles at both folded margins.

The tire produced in this manner molds more easily than tires built in multiple stages, with less effort necessary to produce good adhesion of all components.

Additionally, dramatic improvements in TUG results are had, by comparison to tires made by the two-stage building method: the example-tires of the invention, when compared to regular production tires of comparable construction, evidenced an increase in acceptability of over 20 percent (based on 40-pound limit radial force measurement), an increase of over 40 percent (based on 30-pound limit radial force measurement); and an increase of over 5 percent (based on lateral force measurement).

We have found that the benefits of the inventive construction will be obtained where the open-margin angle of the stabilizer structure lies in the range of 45°–57°, the central-region angle in the range of 60°–65°, and the folded-margin angle in the range of 65°–73°. While different types of tires of differing expansion and molding characteristics may require variations in these ranges, it nevertheless remains that the advantages of the invention are found uniformly in creating an angle-pattern which changes in magnitude in the same direction, from one margin to the other, but also from central area of stabilizer to folded margin. Bearing in mind that the stabilizer-structure between the tire tread and tire-body contains, in any event, two folded margins, there is created a condition of relatively high angles at those margins, adding stability to the tire; and a relatively lower angle across the major, central part of the stabilizer-structure, imparting the desired softer ride. The substantial increase in TUG machines yields of acceptable, high-quality tires bears witness to the increased uniformity obtained, as well, with this construction.

II

In FIG. 5 is shown a stabilizer structure 200 consisting of a single sheet of rubberized reinforcing cords, folded in such a manner as to present the folded margins 201 and 202, as well as open margins 203 and 204.

III

FIG. 6 shows yet another embodiment 300 of the stabilizer, having two open margins 301 and 302 turned toward the center of the stabilizer and creating folded margins 303 and 304.

IV

In FIG. 7, the margins 400 and 401 are shown to overlap.

The modification of FIG. 8 shows the stabilizer comprised of a tubular material, thus creating a structure with exclusively folded margins 500 and 501.

Under certain circumstances, it may be desirable to ease the relative motion of the tire-portions during expansion by coating the contact area between various of the tread, side-walls, stabilizer, and tire body with some type of lubricant during assembly such as, for example, zinc stearate which subsequently melts and is absorbed during vulcanization.

It should be noted that tread and sidewall may be placed entirely over the stabilizer structure, rather than having the sidewall portions and the tread on radially opposite sides of the stabilizer.

What is claimed is:

1. A vulcanized tire comprising
   a. a body portion having rubberized reinforcing cords,
   b. inextensible beads anchoring the margins of said body portion,
   c. sidewall and tread portions radially outwardly of said body portion, and
   d. a rubberized bias-cord stabilizer structure, having a long radius of curvature, radially inwardly of said tread portion, said stabilizer structure comprising
      a. two folded margins,
      b. a width close to that of the shoulder-width of said tread and
      c. cord angles which, measured with respect to the tire rolling axis, increase from the center of the stabilizer structure toward the folded margins.

2. A tire as in claim 1, wherein said stabilizer structure is substantially flat.

3. A tire as in claim 1, wherein said stabilizer structure comprises two folded stabilizer plies.

4. A tire as in claim 1, wherein said stabilizer structure comprises a single ply folded into S-shape.

5. A tire as in claim 1, wherein said stabilizer structure additionally comprises two open margins.

6. A tire as in claim 5, wherein said stabilizer structure comprises a single ply with said open margins folded toward each other.

7. A tire as in claim 6, wherein the said open margins overlap.

8. A tire as in claim 5, wherein the cord angles increase from said open to said folded margins.

9. A tire as in claim 1, wherein said stabilizer structure comprises a flattened tubular member.

* * * * *